(12) United States Patent
Torii

(10) Patent No.: US 7,124,178 B2
(45) Date of Patent: Oct. 17, 2006

(54) PERIPHERAL EQUIPMENT AND PERIPHERAL EQUIPMENT CONTROL METHOD

(75) Inventor: Kan Torii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 577 days.

(21) Appl. No.: 10/131,991

(22) Filed: Apr. 23, 2002

(65) Prior Publication Data

US 2002/0165915 A1 Nov. 7, 2002

(30) Foreign Application Priority Data

Apr. 25, 2001 (JP) ............................. 2001-127736

(51) Int. Cl.
G06F 15/173 (2006.01)
G06F 15/16 (2006.01)

(52) U.S. Cl. ..................... 709/223; 709/217; 709/219

(58) Field of Classification Search ................ 709/202, 709/203, 205, 219, 229, 217, 223
See application file for complete search history.

(56) References Cited

U.S. PATENT DOCUMENTS

| | | | | |
|---|---|---|---|---|
| 5,838,907 A | * | 11/1998 | Hansen | 709/220 |
| 6,029,196 A | * | 2/2000 | Lenz | 709/221 |
| 6,308,205 B1 | * | 10/2001 | Carcerano et al. | 709/221 |
| 6,542,933 B1 | * | 4/2003 | Durst et al. | 709/229 |
| 6,859,843 B1 | * | 2/2005 | Sanchez | 709/250 |
| 6,868,444 B1 | * | 3/2005 | Kim et al. | 709/223 |
| 6,874,021 B1 | * | 3/2005 | Liu et al. | 709/223 |
| 2004/0109027 A1 | * | 6/2004 | Reese et al. | 345/764 |

* cited by examiner

Primary Examiner—Ario Etienne
Assistant Examiner—Sargon N. Nano
(74) Attorney, Agent, or Firm—Fitzpatrick, Cella, Harper & Scinto

(57) ABSTRACT

Peripheral equipment that is capable of providing information to a computer via a network by using a Web server manages a list of components assembled into the peripheral equipment. In the list of components, a plurality of component codes is assigned to each of the components. In response to a demand by a Web client operating on the computer, the Web server outputs the list of components in a format that the Web client can understand. In this instance, the component codes included in the list of components output by the Web server are selected from a plurality of component codes.

25 Claims, 22 Drawing Sheets

| | Attribute Name | Settable | Changeable | Obtainable |
|---|---|---|---|---|
| 605 | Equipment Serial Number | TRUE | FALSE | TRUE |
| 606 | Equipment Name | FALSE | FALSE | TRUE |
| 607 | Equipment Type | FALSE | FALSE | TRUE |
| 608 | Password | TRUE | TRUE | FALSE |
| 609 | Record Information | TRUE | TRUE | TRUE |
| | .... | .. | .. | .. |
| 610 | Region•Language Information | TRUE | TRUE | TRUE |
| 611 | Component Data | TRUE | FALSE | TRUE |

FIG. 6

Attribute values that can be set as
"Region • Language Information"
of Peripheral Equipment

| Germany • German |
| US • English |
| GB • English |
| France • French |
| Japan • Japanese |

(a)

Languages that can be
accommodated by PC

| Australia • English |
| US • English |
| GB • English |
|  |
| Japan • Japanese |

(b)

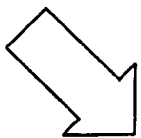
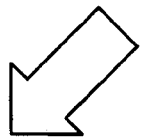

PRODUCT (c)

|  |
| US • English |
| GB • English |
|  |
| Japan • Japanese |

Items to be displayed
on Setting Display

FIG. 10

| Attribute values that can be set as "Region·Language Information" of Peripheral Equipment | Languages demanded by PC (1) | Languages demanded by PC (2) |
|---|---|---|
| Germany · German | | Germany · German |
| US · English | US · English | US · English |
| GB · English | GB · English | GB · English |
| France · French | | France · French |
| Japan · Japanese | | |
| (a) | (b) | (c) |

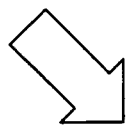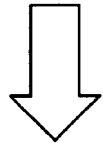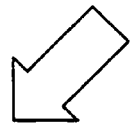

PRODUCT

|  |
|---|
|  |
| US · English |
| GB · English |
|  |
|  |

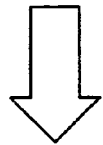 (d)

| US · English |
|---|

Value to be set as "Region · Language Information"

FIG. 13

| Attribute Name | Attribute Value |
|---|---|
| Equipment Serial Number | 1234 |
| Equipment Name | "Colour MFP" |
| Equipment Type | |
| Password | ABCD |
| Record Information | |
| . . . . | . . |
| Region • Language Information | GB • English |
| Component Information | "Scanner Lamp C-ZZASL" "Sheetfeed Roller C-ZZBSR" "Colour Toner C-ZZCCT" . . . |

*FIG. 16*

| Attribute Name: Language | Attribute Value |
|---|---|
| Equipment Name: US • English | "Color MFP" |
| Equipment Name: GB • English | "Colour MFP" |
| Equipment Type: Japan • Japanese | "??-MFP" |
| ... | ... |
| Component US • Information: English | "Scanner Lamp SL1CMFP"<br>"Sheetfeed Roller SR2CMFP"<br>"Color Toner CT3CMFP" |
| Component GB • Information: English | "Scanner Lamp C-ZZASL"<br>"Sheetfeed Roller C-ZZBSR"<br>"Colour Toner C-ZZCCT" |
| Component Japan • Information: Japanese | "??SL001A"<br>"??SFR002A"<br>"??CT003A" |
| ... | ... |

Attribute List (501)

Miscellaneous Undisclosed Information (502)

FIG. 20

PERIPHERAL EQUIPMENT AND PERIPHERAL EQUIPMENT CONTROL METHOD

BACKGROUND OF THE INVENTION

1. Field of the Invention

The present invention relates to peripheral equipment such as printers, scanners, copiers and facsimile machines that can be connected to computers via a network.

2. Description of Related Art

In recent years, a technology has been realized to obtain through Web browsers running on computers logging information of peripheral equipment such as printers, scanners, copiers and facsimile machines that can be connected to the computers via a network as Web content by equipping the peripheral equipment with Web server functions.

Through this technology, various types of information on peripheral equipment can be obtained via the Internet as long as there is a general-purpose Web browser, so that, for example, even information on peripheral equipment installed in a foreign country can be accessed.

However, the conventional technology described above entails the following problems:

When the user accesses, through a Web browser, information on peripheral equipment installed in a foreign country, the user may not be able to understand the meaning of the information held by the peripheral equipment since the information varies by the destination to which each peripheral equipment was shipped.

In addition, although services such as supplying replacement parts become possible by accessing through a remote terminal information on various parts assembled into peripheral equipment, the service personnel may not be able to understand the meaning of component codes since component codes differ by the shipment destination.

SUMMARY OF THE INVENTION

The present invention relates to an apparatus (i.e., peripheral equipment) that solves the problems entailed in the conventional technology described above. More particularly, the present invention provides an apparatus (i.e., peripheral equipment) that enables the user in one destination to obtain information held by peripheral equipment located in a different destination via a network in a desired mode that the user can understand, even when the information is expressed in a mode that may be different from a mode used in the user's destination.

In accordance with an embodiment of the present invention, peripheral equipment that is capable of providing information to a computer via a network by using a Web server manages component information of components assembled into the peripheral equipment. In the component information of components, a plurality of component codes may be assigned to each of the components.

In response to a demand by a Web client operating on the computer, the Web server may output the component information of components in a format that the Web client can understand.

In this instance, the component codes included in the component information of components output by the Web server may be selected from a plurality of component codes.

Other purposes and features of the present invention shall become clear from the following specification and drawings.

BRIEF DESCRIPTION OF THE DRAWINGS

FIG. 6 is a drawing showing an example of an attribute list held by the peripheral equipment shown in FIG. 4.

FIG. 10 is a drawing showing how to select items displayed on the setting screen shown in FIG. 9.

FIG. 13 is a drawing showing the calculation method to determine the attribute value when setting the "Region•Language Information" attribute in the peripheral equipment control system in accordance with the first embodiment of the present invention.

FIG. 16 is a drawing showing an example of attribute information corresponding to FIG. 5 when "GB•English" is set as the "Region•Language Information" attribute in the peripheral equipment control system in accordance with the first embodiment of the present invention.

FIG. 20 is a drawing showing an example of attribute information held under "Miscellaneous Undisclosed Information" in the peripheral equipment control system in accordance with the first embodiment of the present invention.

DESCRIPTION OF THE PREFERRED EMBODIMENTS

Each embodiment of the present invention is described below with reference to the accompanying drawings.

(First Embodiment)

A first embodiment is described with reference to FIGS. 1 through 21.

Figure 1:
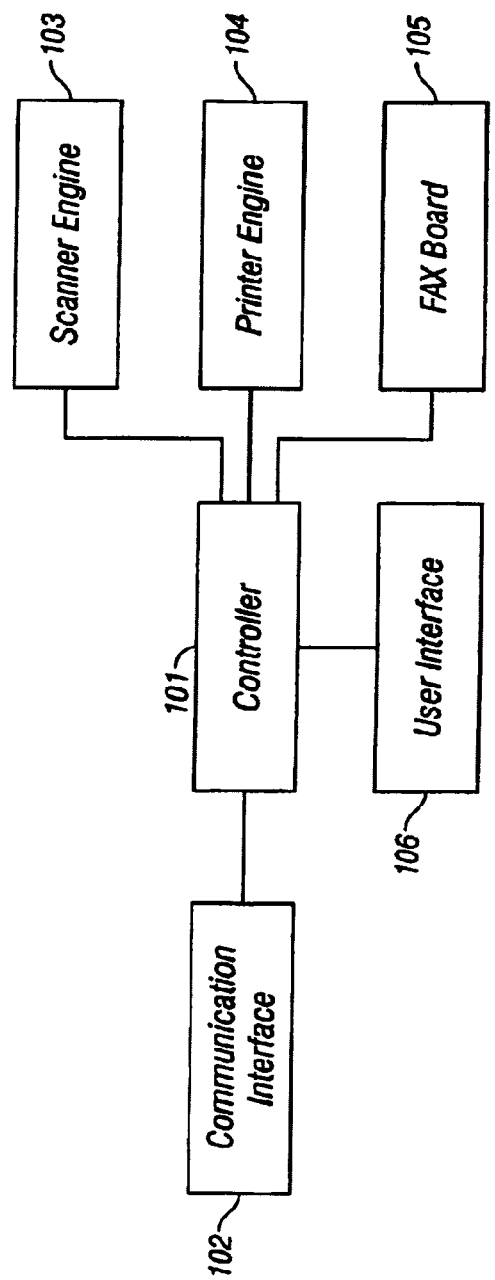
FIG. 1 is a block diagram showing the overall structure of a peripheral equipment control system in accordance with a first embodiment of the present invention.

FIG. 1 is a block diagram showing the overall configuration of a peripheral equipment control system in accordance with the first embodiment of the present invention.

Figure 2:
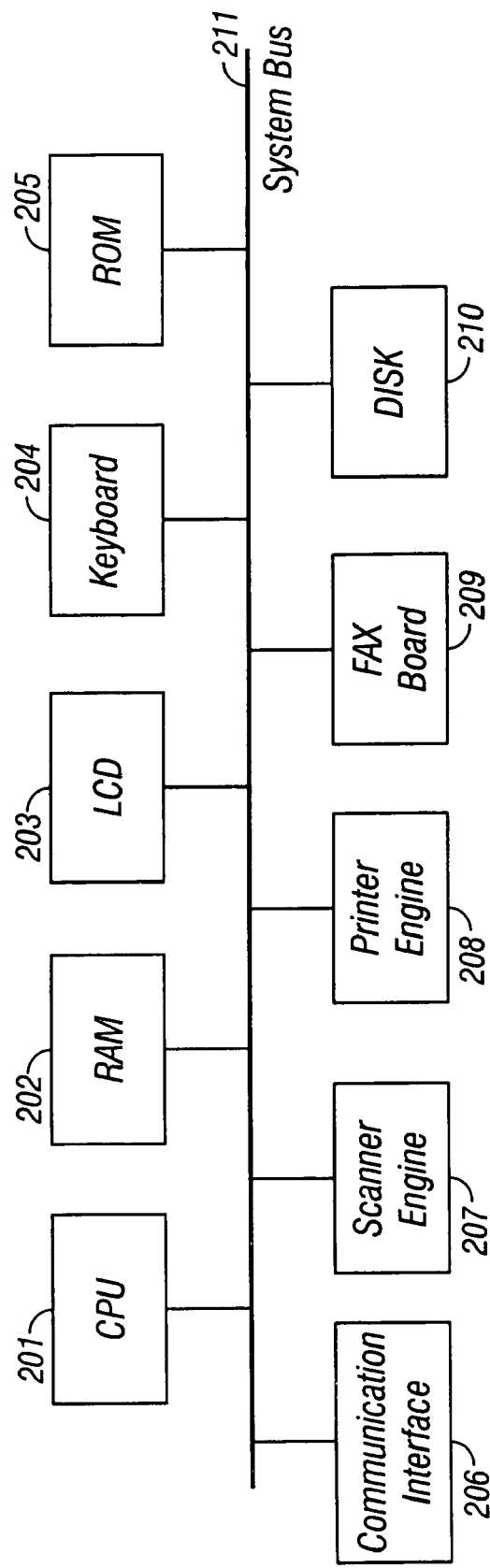
FIG. 2 is a block diagram showing an example of a hardware configuration of a controller shown in FIG. 1.

In FIG. 1, reference numeral 101 denotes a controller that controls a peripheral apparatus (i.e., peripheral equipment) and has a hardware configuration as indicated in FIG. 2 discussed later. Reference numeral 102 denotes a communication interface for the controller 101 to communicate outside the peripheral equipment, and the communication interface 102 can be, for example, an Ethernet (R) interface, IEEE1284 interface, or other communication interfaces. Reference numeral 103 denotes a scanner engine, one of the peripheral equipment, which is controlled by the controller 101. Reference numeral 104 denotes a printer engine, one of the peripheral equipment, which is controlled by the controller 101. The printer engine 104 can be, for example, a laser beam printer, an inkjet printer or other printers. Reference numeral 105 denotes a fax board, peripheral equipment to realize fax (facsimile) functions such as communication control when sending or receiving images, which is controlled by the controller 101. Reference numeral 106 denotes a user interface and is comprised of a display such as an LCD (liquid crystal display) and a keyboard. The fax board 105 displays information from the controller 101, while also conveying instructions from the user to the controller 101.

The peripheral equipment control system having a configuration described above can issue print jobs using the printer engine 104. It can also issue copy jobs by using the printer engine 104 and the scanner engine 103. Furthermore, it can issue fax reception jobs and fax transmission jobs by using the printer engine 104, the scanner engine 103 and the fax board 105.

FIG. 2 is a block diagram of a hardware configuration built around the controller 101 shown in FIG. 1. In the controller 101 shown in FIG. 1, a CPU (central processing unit) 201, a RAM (random access memory) 202, an LCD 203, a keyboard 204, a ROM (read-only memory) 205, a communication interface 206, a scanner engine 207, a printer engine 208, a fax board 209, and a disk 210 are mutually connected via a system bus 211, as shown in FIG. 2.

A program that controls the controller 101 shown in FIG. 1 is store in the ROM 205 or the disk 210, and is read onto the RAM 202 and executed by the CPU 201 as necessary. In addition to the control program, the RAM 202, the ROM 205 and the disk 210 also store attribute information that indicates the function and status of peripheral equipment, as well as those of jobs processed by the peripheral equipment, and job data to be output. The CPU 201 displays through the LCD 203 and receives user instructions through the keyboard 204. Additionally, the CPU 201 communicates with the outside through the communication interface 206.

Unless otherwise noted, in the peripheral equipment control system in FIG. 1 for the present embodiment, the CPU 201 receives via the system bus 211 user input from the keyboard 204, while also controlling and executing the functions of the RAM 202, the LCD 203, the ROM 205, the communication interface 206, the scanner engine 207, the printer engine 208 and the fax board 209.

Figure 3:
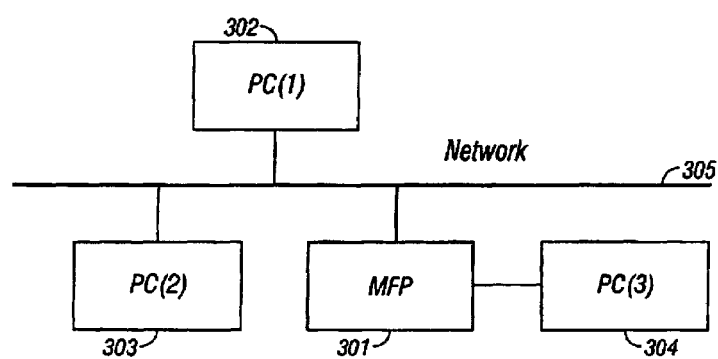
FIG. 3 is a block diagram showing an example of a network system configuration on which peripheral equipment shown in FIG. 1 operates.

FIG. 3 is a block diagram showing an example of a network system configuration on which the peripheral equipment control system shown in FIG. 1 operates. An MFP 301 represents the peripheral equipment control system shown in FIG. 1, and peripheral equipment PC (1) 302, PC (2) 303 and PC (3) 304 each has a hardware configuration as shown in FIG. 1 and represents a PC (personal computer) connected to the MFP 301 via a network 305. A network station, other peripheral equipment or other equipment can be connected to the MFP 301 via the network 305.

Driver software and equipment management applications can request job processing such as printing, scanning, copying, or fax sending/receiving, and inquire about attribute information on the MFP 301 from the PC (1) 302, the PC (2) 303 or the PC (3) 304 to the MFP 301 via the network 305.

Figure 4:
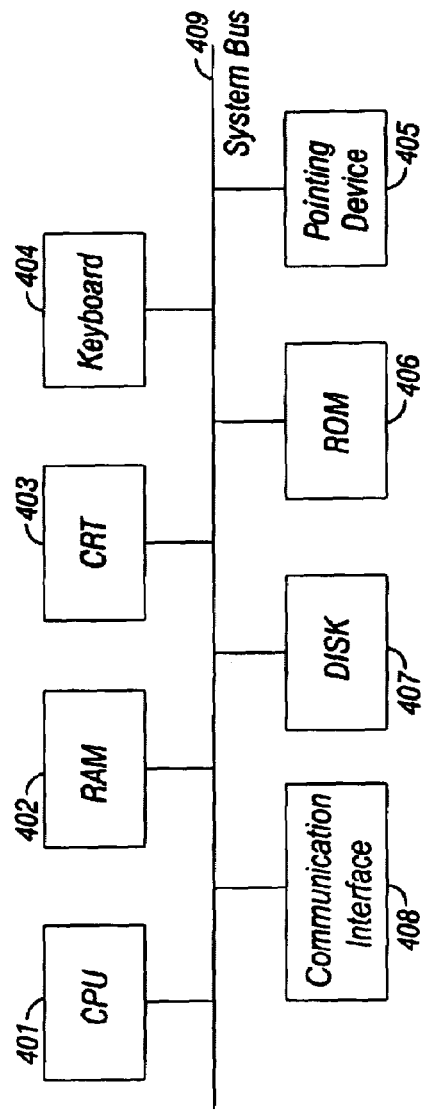
FIG. 4 is a block diagram showing an example of a hardware configuration of a PC that comprises the system shown in FIG. 3.

FIG. 4 is a block diagram showing a hardware configuration of a PC that comprises the network system shown in FIG. 3.

In the PC shown in FIG. 4, a CPU 401, a RAM 402, a CRT (cathode ray tube) 403, a keyboard 404, a pointing device 405, a ROM 406, a DISK 407, and a communication interface 408 are mutually connected via a system bus 409.

A program to control the PC is stored in the ROM 406 or the DISK 407, and is read onto the RAM 402 and executed by the CPU 401 as necessary. The CPU 401 displays through the CRT 403 and receives user instructions through the keyboard 404 and/or the pointing device 405. Additionally, the CPU 401 communicates with the outside through the communication interface 406.

Unless otherwise noted, in the PC in FIG. 4, the CPU 401 via the system bus 211 receives user input from the keyboard 404 and/or the pointing device 405, while also controlling and executing the functions of the RAM 402, the CRT 403, the ROM 406, the disk 407, and the communication interface 408.

User instructions to or display of information to the user from the peripheral equipment control system shown in FIG. 1 can be performed through the local user interface 106 shown in FIG. 1, or can be performed through a client equipment such as the PC (1) 302, the PC (2) 303 or the PC (3) 304 shown in FIG. 3 connected via the network 305.

Figure 5:
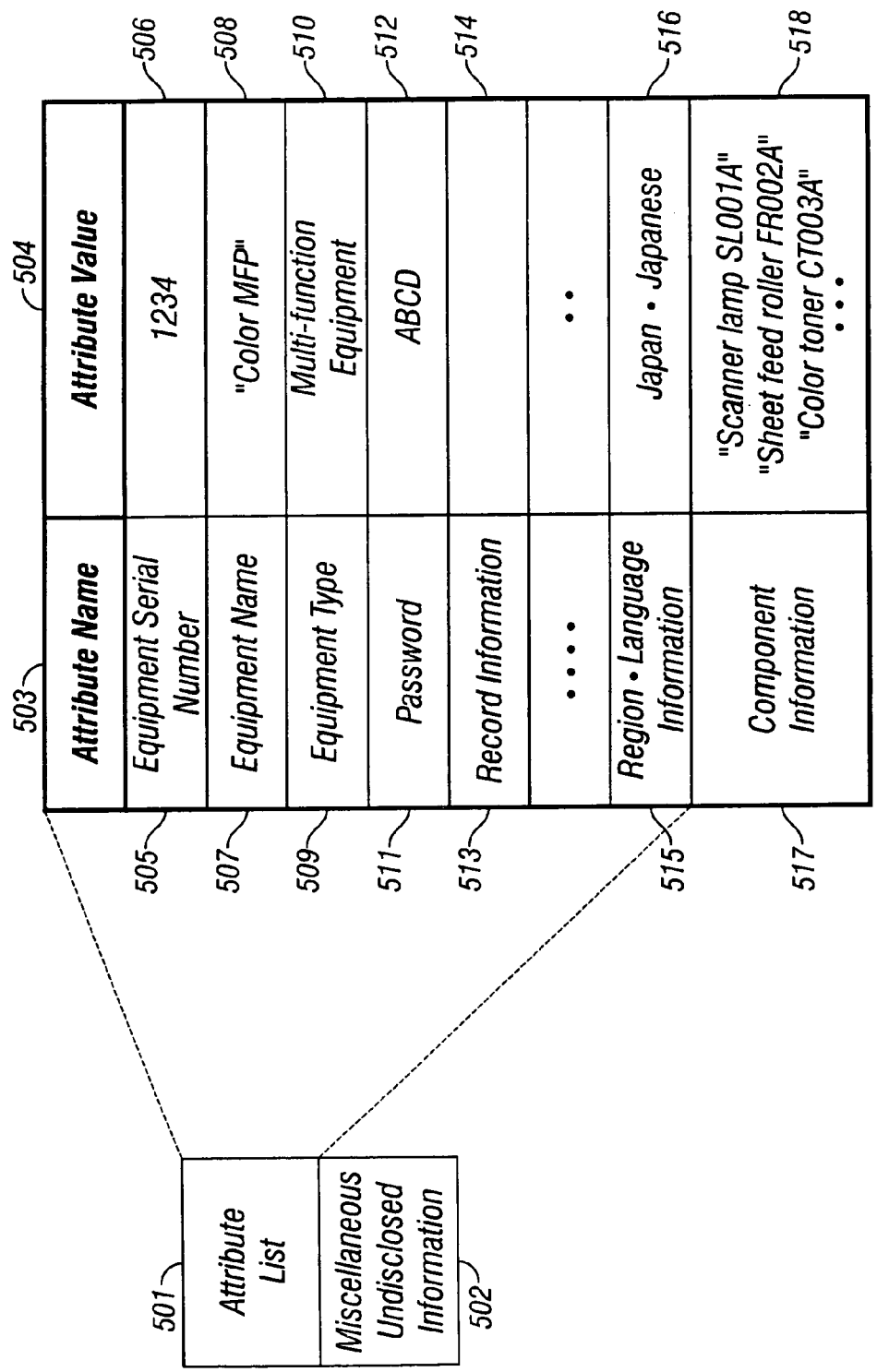
FIG. 5 is a drawing showing an example of a structure of attribute information stored in the peripheral equipment shown in FIG. 4.

FIG. 5 shows an example of a structure of attribute information stored in the peripheral equipment control system shown in FIG. 1. The information held by the peripheral equipment control system shown in FIG. 1 consists of an attribute list 501 that indicates the functions and status of peripheral equipment and undisclosed data 502 that indicates data used internally. The attribute list 501 is a list of attribute names and their attribute values, as indicated in 503 through 518, and indicates the current function or status of equipment.

The attribute list 501 may have a structure in which attribute identifiers are designated instead of attribute names under the column 503. Additionally, attributes listed under the attribute list 501 are identical to those listed under "List of Attributes Supported by Equipment" shown in FIG. 6 described later.

Items under the column 503 indicate various attribute names, and items under a column 504 indicate attribute values corresponding to various attributes indicated by the attribute names under the column 503. An attribute 505 indicates the identifier of the peripheral equipment input. Its attribute value 506 indicates that the "Equipment Serial Number" is "1234." An attribute 507 indicates the name of the peripheral equipment. Its attribute value 508 indicates that the "Equipment Name" is "Color MFP." An attribute 509 indicates the type of the peripheral equipment. Its attribute value 510 indicates that the "Equipment Type" is "Multifunction Equipment." An attribute 511 indicates the password required when using the peripheral equipment. Its attribute value 512 indicates that the "Password" is "ABCD." An attribute 513 indicates the type of information to be recorded in the use history of the peripheral equipment. Its attribute value 514 indicates that the "Record Informa-tion" is "Printer, Fax." An attribute 515 indicates the region and language information used by the peripheral equipment. Its attribute value 516 indicates that the "Region•Language Information" is "Japan•Japanese." An attribute 517 indicates a list of components installed on the peripheral equipment. Its attribute value 518 indicates that the "List of Components" is "Scanner Lamp SL001A," "Sheet Feed Roller SFR002A," "Color Toner CT003A," etc. Character strings such as "SL001A" indicate component codes managed by dealers in Japan.

FIG. 6 is a drawing showing an example of "List of Attributes Supported by Equipment," which is a list of attributes held by the peripheral equipment control system shown in FIG. 1, and this information is store in the ROM 205 and/or disk 210 in FIG. 2. However, attributes listed in the "List of Attributes Supported by Equipment" can be attributes other than those shown in FIG. 6.

In FIG. 6, reference numeral 601 denotes an attribute name column, reference numeral 602 denotes a column that indicates whether setting can be done, reference numeral 603 denotes a column that indicates whether changes can be made, reference numeral 604 denotes a column that indicates whether the applicable information can be acquired, and reference numerals 605 through 611 denote rows.

The "List of Attributes Supported by Equipment" in FIG. 6 lists all attributes held by the applicable peripheral equipment. In addition, the "List of Attributes Supported by Equipment" indicates the attribute names (the attribute name column 601), as well as whether each attribute's attribute value can be set when the PC in FIG. 3 ships from the factory (the setting column 602), whether each attribute's attribute value can be changed after it has been set (the change column 603), and whether each attribute's attribute value can be acquired (the acquisition column 604); each cell is marked "TRUE" when the issue in question is possible and "FALSE" when the issue in question is not possible. The row 605 indicates the support status of an "Equipment Serial Number" attribute. The "Equipment Serial Number" attribute can be set, cannot be changed, and can be acquired. In other words, it shows that setting is possible only when the PC ships from the factory. The row 606 indicates the support status of an "Equipment Name" attribute. An "Equipment Name" attribute cannot be set, cannot be changed and can be acquired. The row 607 indicates the support status of an "Equipment Type" attribute. The "Equipment Type" attribute cannot be set, cannot be changed and can be acquired. The row 608 indicates the support status of a "Password" attribute. The "Password" attribute can be set, can be changed and cannot be acquired. The row 609 indicates the support status of a "Record Information" attribute. The "Record Information" attribute can be set, can be changed and can be acquired. The row 610 indicates the support status of a "Region•Language Information" attribute. The "Region•Language Information" attribute can be set, can be changed and can be acquired. The row 611 indicates the support status of the "List of Components" attribute. The "List of Components" attribute can be set, cannot be changed and can be acquired.

Figure 7:
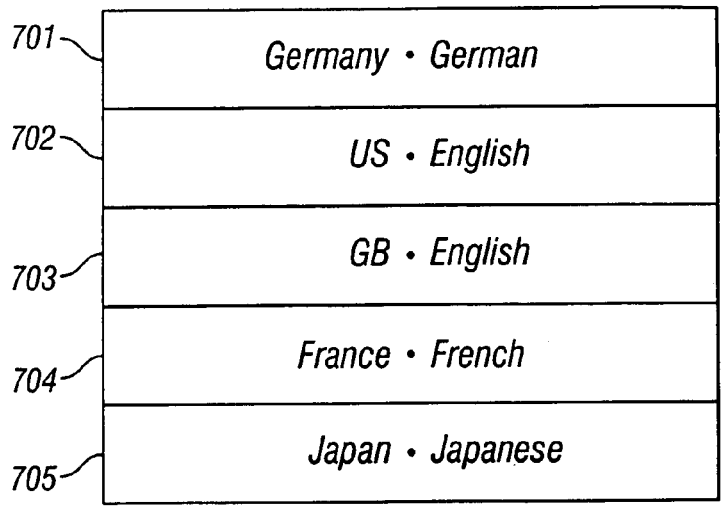
FIG. 7 is a drawing showing an example of a list of values that can be set as the "Region•Language Information" attribute held by the peripheral equipment held in FIG. 4.

FIG. 7 shows an example of a "List of Attributes That Can Be Designated As Region•Language Information" held by the peripheral equipment control system shown in FIG. 1 and stored in the ROM 205 and/or the disk 210 in FIG. 2.

The "List of Attributes That Can Be Designated As Region•Language Information" in FIG. 7 lists attribute values that a PC in FIG. 3 can designate as the value of the "Region•Language Information" attribute held by the peripheral equipment control system. However, the attribute values listed in the "List the Attribute Values That Can Be Designated As Region•Language Information" can be attribute values other than those shown in FIG. 7.

In the present embodiment, the "Region•Language Information" attribute, along with other attributes required depending on the setting value of the "Region•Language Information" attribute, is listed in the "List of Attributes Supported by Equipment" in FIG. 6 and held by the peripheral equipment control system shown in FIG. 1, By having a PC set the "Region•Language Information" attribute, the content of a character string attribute presented by the peripheral equipment control system in FIG. 1 becomes updated.

In FIG. 7, an attribute value "Germany•German" 701 indicates that the German language commonly used in Germany is used. An attribute value "US•English" 702 indicates that the English language commonly used in the United States of America is used. An attribute value "GB•English" 703 indicates that the English language commonly used in Great Britain different from the attribute value "US•English" 702 is used. An attribute value "France•French" 704 indicates that the French language commonly used in France is used. And an attribute value "Japan•Japanese" 705 indicates that the Japanese language generally considered the standard language in Japan is used.

Figure 8:
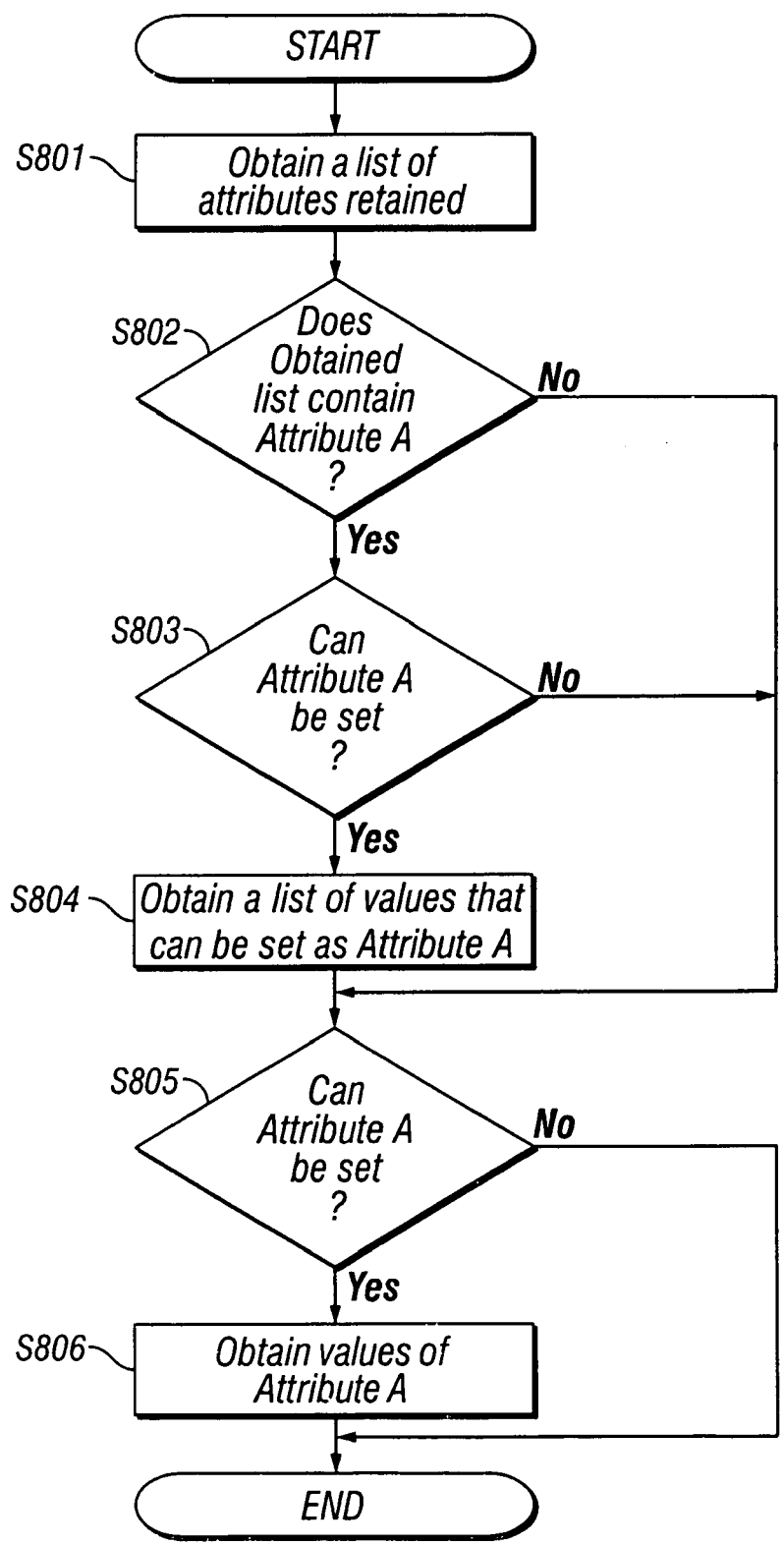
FIG. 8 is a flowchart showing an example of the flow of process operation to inquire the peripheral equipment shown in FIG. 4 about capability information of the peripheral equipment.

Next, referring to FIG. 8, a description is made as to the process operation that takes place when a PC in FIG. 3 makes an inquiry to one of the peripheral equipment in FIG. 1 about attribute information on that peripheral equipment.

FIG. 8 is a flowchart showing the flow of process operation that takes place when a PC in FIG. 3 makes an inquiry to one of the peripheral equipment in FIG. 1 about attribute information on that peripheral equipment.

First, in step S801, a demand is made to acquire the "List of Attributes Supported by Equipment" from one of the peripheral equipment and the list of attributes is obtained. In the next step S802, a determination is made as to whether the attribute "Region•Language Information" (indicated by "A") that represents functions that the PC requires is included in the "List of Attributes Supported by Equipment" acquired in the preceding step S801. If the answer is affirmative (Yes), the process proceeds to step S803; if the answer is negative (No), the process proceeds to step S805.

In step S803, a determination is made as to whether the PC can set the "Region•Language Information" attribute from among the list of attributes acquired in the previous step S801. If the answer is affirmative (Yes), the process proceeds to step S804; if the answer is negative (No), the process proceeds to step S805.

In step S804, a list of attribute values that can be set as the "Region•Language Information" attribute is acquired from the peripheral equipment in FIG. 1; and then the process proceeds to step S805.

In step S805, whether the "Region•Language Information" attribute is an attribute that the PC can acquire is determined. If the answer is affirmative (Yes), the process proceeds to step S806; if the answer is negative (No), the process operation ends.

In step S806, a demand is made to acquire the value of the "Region•Language Information" attribute from the peripheral equipment, and after the value of the "Region•Language Information" attribute is acquired the process operation ends.

Through the above processing, the PC can obtain information regarding what attributes the peripheral equipment in FIG. 1 holds, as well as information regarding which attribute values can be designated as the "Region•Language Information" attribute. Furthermore, it can obtain information indicative of the values of the "Region•Language Information" attribute.

Figure 9:
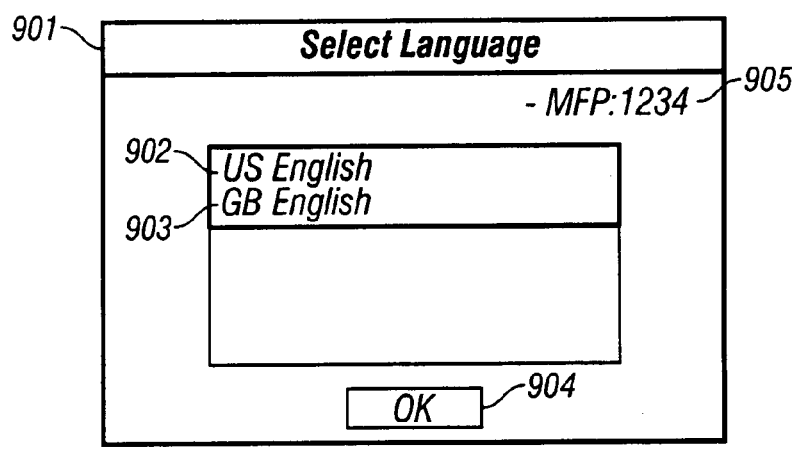
FIG. 9 is a drawing showing an example of a setting screen for the "Region•Language Information" attribute of the peripheral equipment shown in FIG. 4.

FIG. 9 is a drawing showing an example of a setting screen for the "Region•Language Information" attribute in the peripheral equipment control system in accordance with the present embodiment.

The screen in FIG. 9 is a screen in which the user sets the "Region•Language Information" attribute and is displayed on the PC (1) 302, the PC (2) 303, or the PC (3) 304 in FIG. 3. Before the screen shown in FIG. 9 is created, the PC (1) 302, the PC (2) 303, or the PC (3) 304 that displays the screen in FIG. 9 will have acquired the list of values that can be set as the "Region•Language Information" attribute through the flow of processes to acquire attribute information in FIG. 8.

In FIG. 9, the title of a setting screen 901 indicates a brief description of the setting screen 901 and indirectly indicates that the purpose of the setting screen 901 is to designate the value of the "Region•Language Information" attribute. A list box 902 displays a list of a product of a set of attribute values that can be set as the "Region•Language Information" attribute obtained through the flow of processes to acquire attribute information in FIG. 8 and a set of regions-languages that can be accommodated by the PC. In the example in FIG. 9, the PC can accommodate only Japanese and English, so that although there are five types of attribute values that can be set as the "Region•Language Information" attribute, only three types are displayed as elements on the list.

FIG. 10 shows the calculation used to arrive at the product, where (a) the product of the attribute values that can be set as the "Region•Language Information" attribute of the peripheral equipment and (b) languages that can be accommodated by the PC becomes (c) the items displayed on the setting screen.

The attribute values listed in the list box 902 correspond to the items listed on the list of values that can be set as the "Region•Language Information" attribute in FIG. 7. By using the keyboard 404 and/or the pointing device 405 in FIG. 4, the user can select the desired setting value from the list box 902. A highlighted display 903 indicates the values of the "Region•Language Information" attribute currently selected, which in FIG. 9 are "US•English" and "GB•English." An OK button 904 is a button to decide the value indicated by the highlighted display 903 as the attribute value of the "Region•Language Information" attribute. "US•English" and "GB•English" may be displayed in English to make it easier for the English-speaking user to understand. A text 905 displays character strings held under the "Equipment Name" attribute and a number held under the "Equipment Serial Number" of the peripheral equipment.

Figure 11:
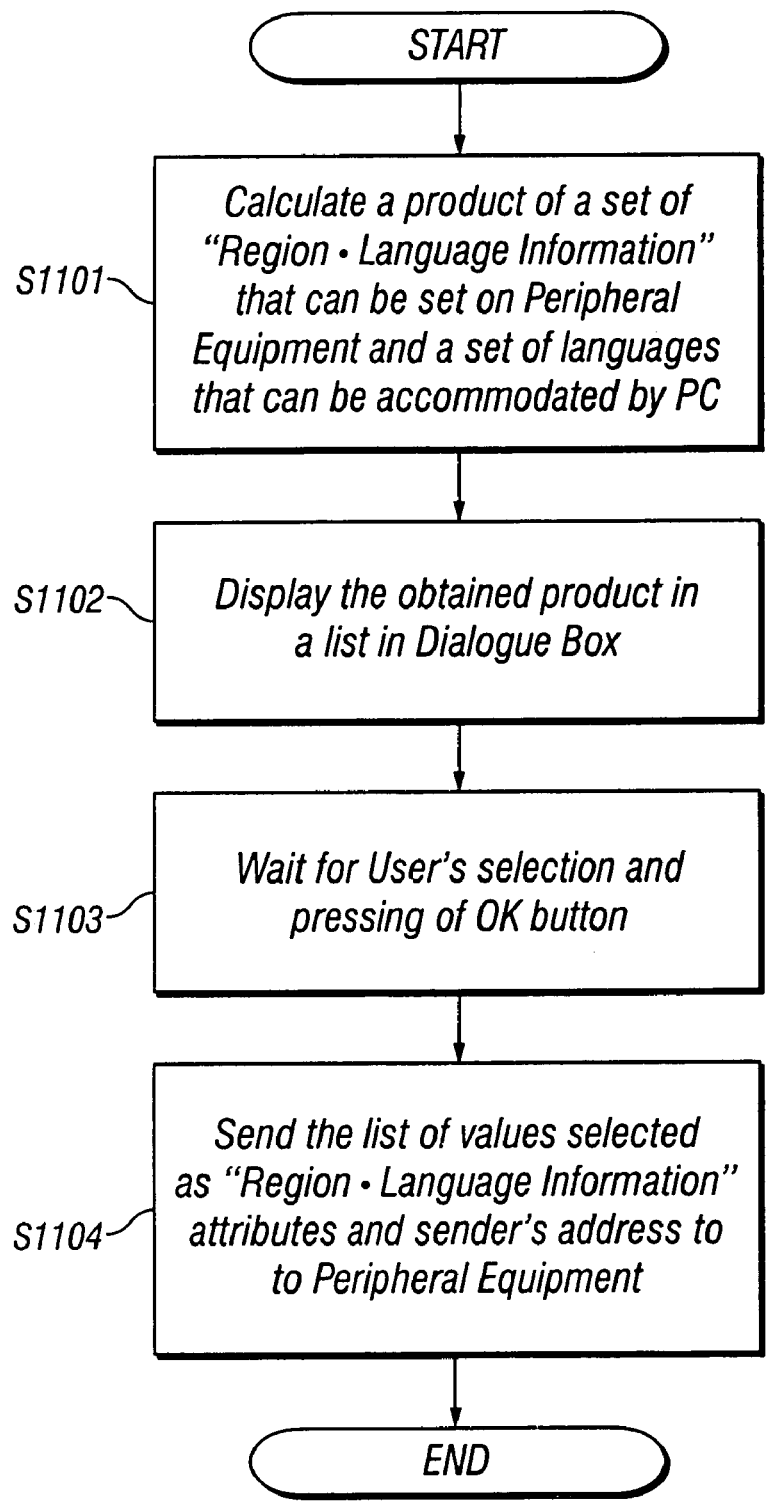
FIG. 11 is a flowchart showing an example of the flow of process operation to set the "Region•Language Information" attribute of the peripheral equipment according to a user selection in the peripheral equipment control system in accordance with the first embodiment of the present invention.

Next, referring to FIG. 11, a description is made as to the process operation that takes place when a PC in FIG. 3 sets the attributes of one of the peripheral equipment in FIG. 1 by having the user select and designate a region and language for the "Region•Language Information" attribute.

FIG. 11 is a flowchart indicating the flow of processes whereby a PC in FIG. 3 sets the attributes of one of the peripheral equipment in FIG. 1 by having the user select and designate a region and language for the "Region•Language Information" attribute.

First, in step S1101, the product of the set of attribute values that can be set as the "Region•Language Information" attribute that were obtained by following the flowchart in FIG. 8, and the set of regions-languages that the PC in FIG.

3 can display, is calculated. In the next step S1102, the product obtained in the preceding step S1101 is displayed on the setting screen for the "Region•Language Information" attribute in FIG. 9. In the following step S1103, the user selects the region•language and presses the OK button 904. Once the OK button 940 is pressed, the process proceeds to step S1104.

In step S1104, after sending to the peripheral equipment the setting demand for the region•language selected by the user as the "Region•Language Information" attribute of the peripheral equipment, as well as the address of the program (peripheral equipment control software) itself, the process operation ends.

It is noted that the region•language attribute of the peripheral equipment is not set with only the setting demand.

Figure 12:
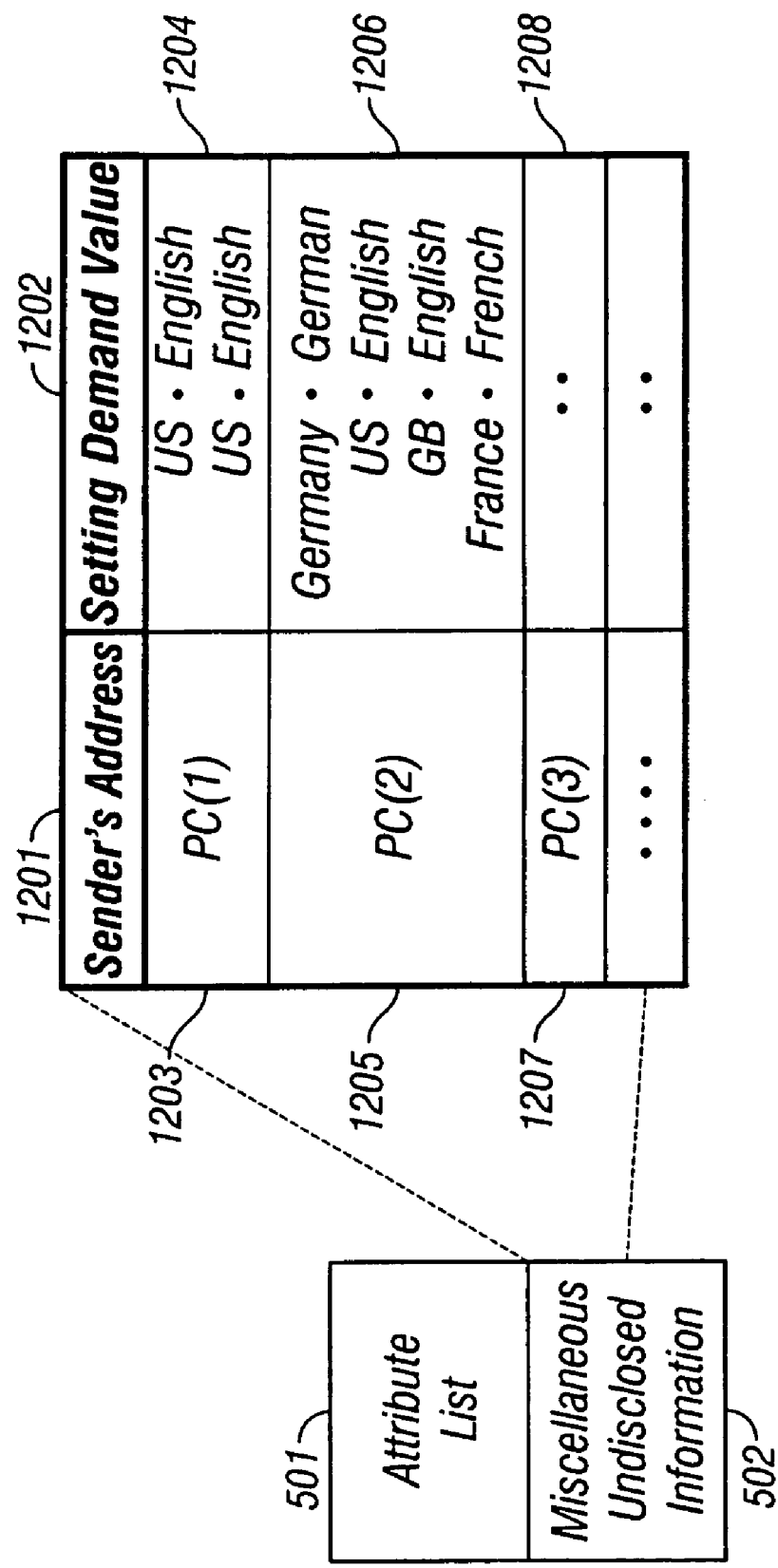
FIG. 12 is a drawing showing the record of setting demands in the peripheral equipment control system in accordance with the first embodiment of the present invention.

FIG. 12 is a drawing indicating the structure of setting demand information stored in the miscellaneous undisclosed information. In the figure, reference numeral 501 denotes the attribute list; reference numeral 502 denotes the miscellaneous undisclosed information; reference numerals 1201 and 1202 denote columns; reference numerals 1203, 1205 and 1207 denote sender addresses; and reference numerals 1204, 1206 and 1208 denote setting demand values.

Under the column 1201, the sender addresses 1203, 1205 and 1207 of the PCs that sent the setting demand are recorded. Under the column 1202, there are the setting demand contents 1204, 1206 and 1208 for the "Region•Language Information" setting demands from the corresponding PCs. If another setting demand is made from the same PC, the applicable previous setting demand content 1204, 1206 or 1208 is overwritten. For example, when setting demand information is stored as shown in FIG. 12, if another setting demand is made from the PC (1) in the field 1203 the content of the field 1204 is overwritten.

Based upon the information stored as shown in FIG. 12, the attribute value of the "Region•Language Information" attribute of the peripheral equipment is determined through a product calculation such as the one shown in the columns in FIG. 13.

In FIG. 13, the product of (a) the attribute values that can be set as the "Region•Language Information" attribute of the peripheral equipment, (b) languages demanded by the PC (1) 303, and (c) languages demanded by the PC (2) 304 becomes (d) the value set as the "Region•Language Information" attribute.

Setting demands from PCs are in sets of attribute values. First, a product of setting demands from all the PCs recorded is created. From the product, attribute values that can be set as the "Region•Language Information" attribute are selected and one of them becomes the "Region•Language Information" attribute value. In the present embodiment, the attribute value that appears first in the set list is selected.

Figure 14:
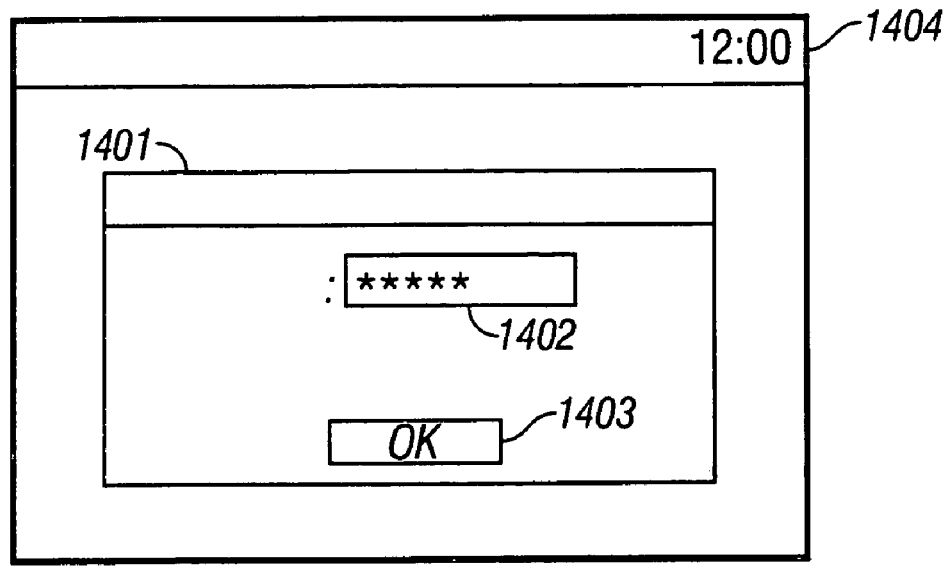
FIG. 14 is a drawing showing an example of a password screen of the peripheral equipment when "Japan•Japanese" is set as the "Region•Language Information" attribute in the peripheral equipment control system in accordance with the first embodiment of the present invention.

FIG. 14 is a drawing showing an example of a screen displayed on an LCD of peripheral equipment. This screen is shown when "Japan•Japanese" is set as the "Region•Language Information" attribute of the peripheral equipment. The peripheral equipment control system according to the present embodiment does not allow the peripheral equipment to be used unless a password is entered in this screen.

In FIG. 14, a title 1401 of the dialog box displays an instruction in Japanese to the user. A text box 1402 is a field to enter the password. By pressing an OK button 1403 as in FIG. 9, the user confirms the password. A text 1404 displays the current time.

Figure 15:
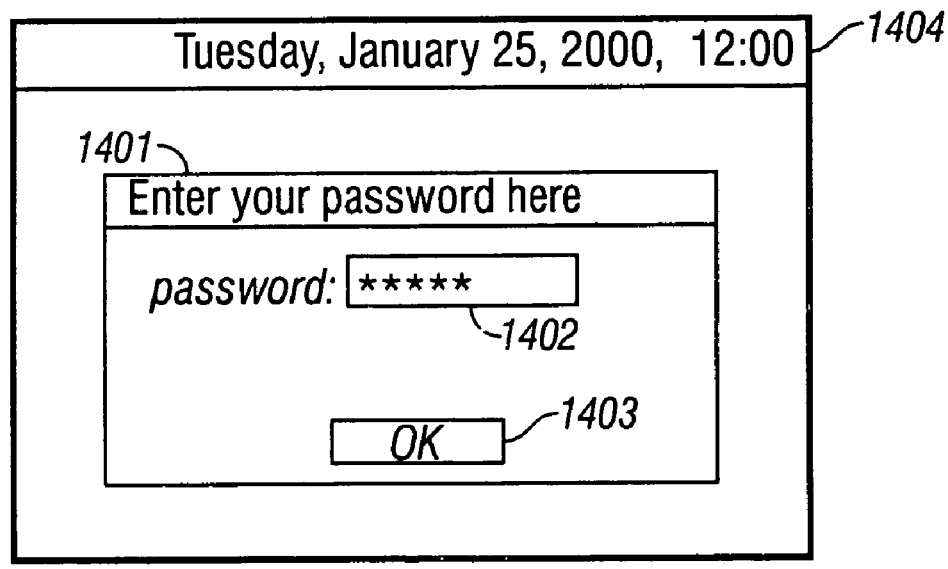
FIG. 15 is a drawing showing an example of a password screen of the peripheral equipment when "US•English" is set as the "Region•Language Information" attribute in the peripheral equipment control system in accordance with the first embodiment of the present invention.

FIG. 15 is a drawing showing an example of the same screen when "US•English" is set as the "Region•Language Information" attribute, and those parts that are identical to parts in FIG. 14 are numbered the same. The difference in FIG. 15 compared to FIG. 14 is that items that were displayed in Japanese in FIG. 14 (1401 through 1404) are in English in FIG. 15; the text 1404 in particular displays the date and time in an American format.

FIG. 16 is a drawing showing attribute information equivalent to that in FIG. 5 when "GB•English" is set as the "Region•Language Information" attributes; reference numeral 1601 denotes an attribute name column; reference numeral 1602 denotes an attribute value column; reference numerals 1603, 1605, 1607, 1609, 1611, 1613 and 1615 are attribute names; and reference numerals 1604, 1606, 1608, 1610, 1612, 1614 and 1616 denote attribute values.

The difference in FIG. 16 compared to FIG. 5 is that the attribute value corresponding to the "Equipment Name" attribute is "Colour MFP" in FIG. 16, while in FIG. 5 it is "Color MFP" in Japanese. Additionally, attribute values corresponding to the "List of Components" attribute in FIG. 5 are component codes used in Japan and displayed in Japanese, but in FIG. 16 the component codes are those used in Great Britain and are displayed in British English.

Figure 17:
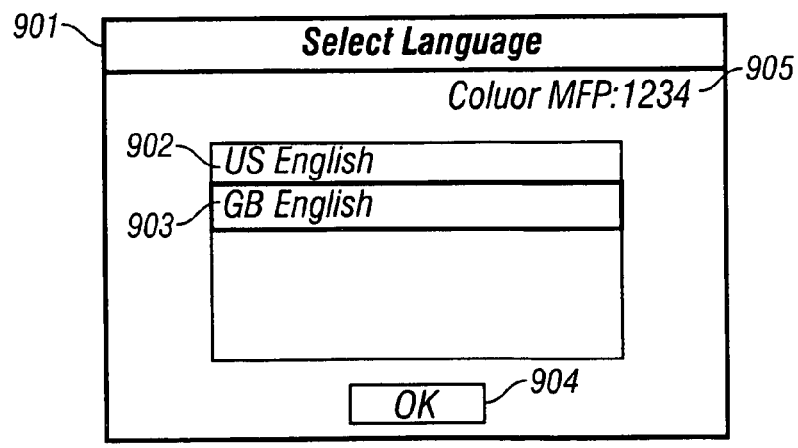
FIG. 17 is a drawing showing an example of a setting screen for "Region•Language Information" when "GB•English" is set as the "Region•Language Information" in the peripheral equipment control system in accordance with the first embodiment of the present invention.

FIG. 17 is a drawing showing an example of the "Region•Language Information" setting screen equivalent to FIG. 9 when "GB•English" is set as the "Region•Language Information" attribute, and those parts that are identical to parts in FIG. 9 are numbered the same. The difference in FIG. 17 compared to FIG. 9 is that while in FIG. 9 equipment name and serial number are displayed in Japanese, they are displayed in English in FIG. 17.

Figure 18:
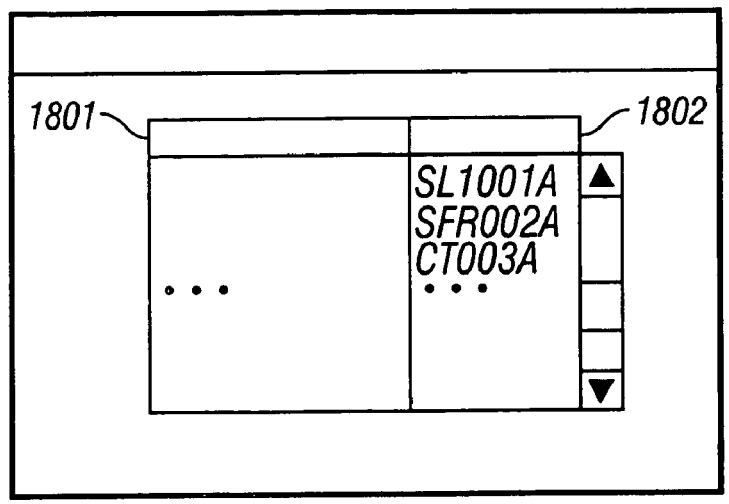
FIG. 18 is a drawing showing a dialog box (when "Japan•Japanese" is set as the "Region•Language Information" attribute) on a PC listing the contents of "List of Components" attribute in the peripheral equipment control system in accordance with the first embodiment of the present invention.

FIG. 18 is a drawing showing a dialog box to list the contents of the "List of Components" attribute displayed on the CRT of a PC shown in FIG. 3. In this example, we assume that "Japan•Japanese" is set as the "Region•Language Information" attribute. On the left side of this screen is a component name column 1801 and on the right is a component code column 1802.

Figure 19:
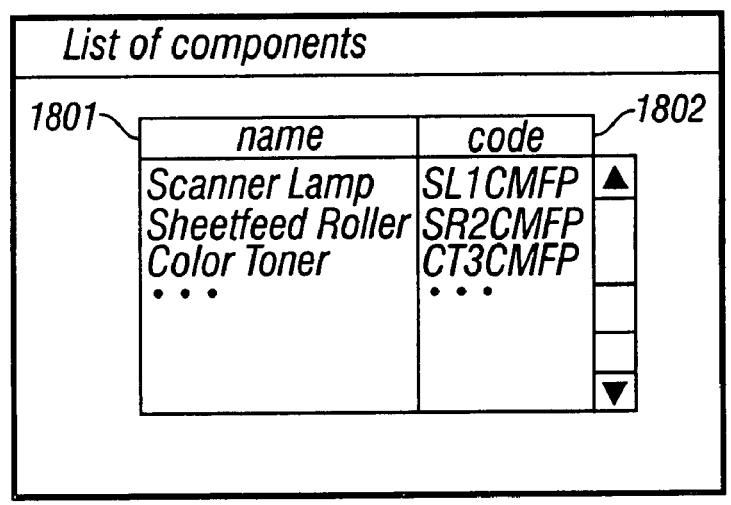
FIG. 19 is a drawing showing a dialog box (when "US•English" is set as the "Region•Language Information" attribute) on a PC listing the contents of "List of Components" attribute in the peripheral equipment control system in accordance with the first embodiment of the present invention.

FIG. 19 is a drawing showing a dialog box equivalent to the screen shown in FIG. 18 when "US•English" is set as the "Region•Language Information" attribute, and those parts in FIG. 19 that are identical to parts in FIG. 18 are numbered the same. The difference in FIG. 19 compared to FIG. 18 is that while the contents of the "List of Components" attribute in FIG. 18 are displayed in Japanese, in FIG. 19 they are displayed in English and component codes have been replaced with those used in the U.S.

FIG. 20 is a drawing showing attribute information held in the "Miscellaneous Undisclosed Information" 502 in FIG. 5 to be used when information such as "Equipment Name" or "List of Components" is changed by the setting of the "Region•Language Information" attribute. In FIG. 20, reference numeral 501 denotes the attribute list; reference numeral 502 denotes the miscellaneous undisclosed information; reference numeral 2001 denotes an attribute name/language column; reference numeral 2002 denotes an attribute value column; reference numerals 2003, 2005, 2007, 2009, 2011, 2013 and 2015 denote combinations of an attribute name, a region and a language; reference numerals 2004, 2006, 2008, 2010, 2012, 2014 and 2016 denote attribute values. In FIG. 20, attribute names "Equipment Name" and "List of Components" are available for each region•language. In the attribute name/language column 2001 there are combinations of an attribute name, a region and a language; in the attribute value column 2002 there is an attribute value that corresponds to each "Attribute Name, Region and Language."

Next, we will explain the algorithm used to update attribute information depending on the value set as the "Region•Language Information" attribute.

Figure 21:
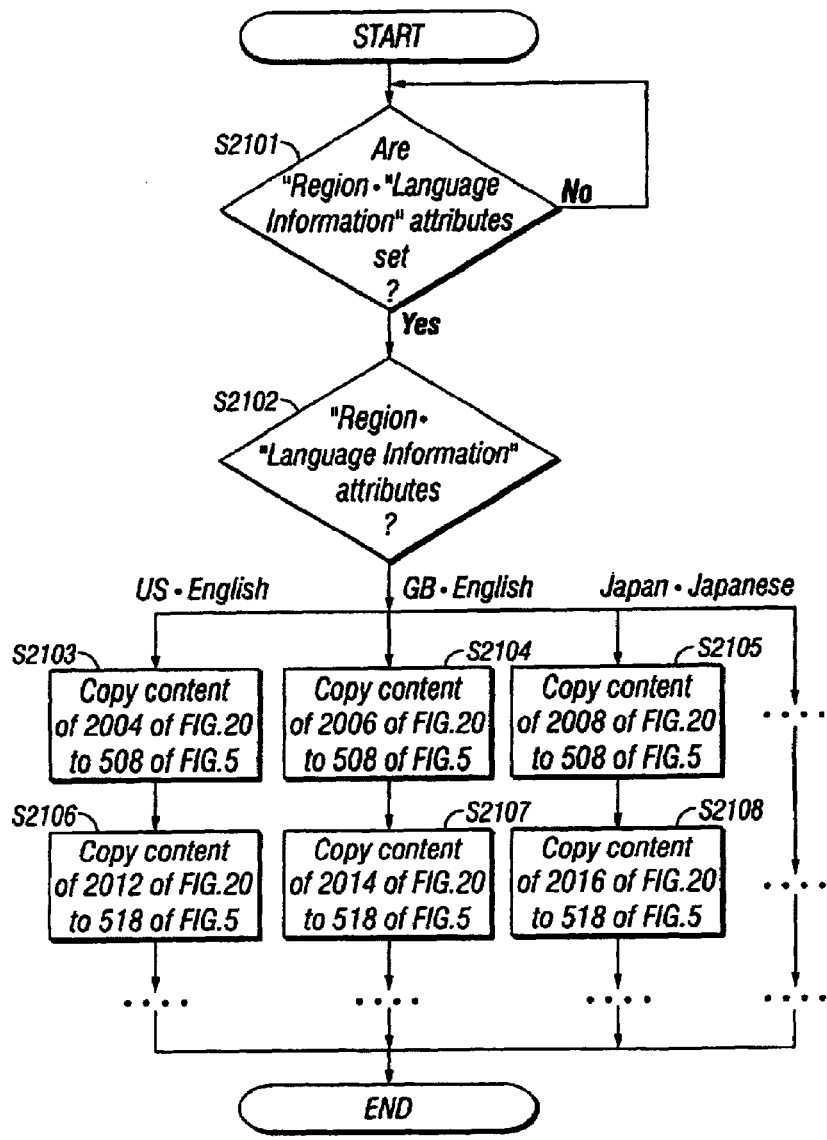
FIG. 21 is a drawing showing an algorithm to update other attribute values depending on the setting of the "Region•Language Information" attribute in the peripheral equipment control system in accordance with the first embodiment of the present invention.

FIG. 21 is a drawing showing an algorithm used to update attribute information depending on the value set as the "Region•Language Information" attribute.

At the first divergence, processing varies depending on the value of the "Region•Language Information" attribute. In the subsequent processing, an attribute value corresponding to the region/language information of each attribute is copied onto the appropriate field in the attribute value column 504 in FIG. 5.

That is, first in step S2101 whether the "Region•Language Information" attribute has been set is determined until it is set. If the answer to this is affirmative (Yes), the processing proceeds to the next step S2102 and determines the content of the "Region•Language Information" attribute. If the "Region•Language Information" attribute is "US•English" the process proceeds to step S2103; if it is "GB•English" the process proceeds to step S2104; and if it is "Japan•Japanese" the process proceeds to step S2105.

In step S2103, the content of the field 2004 in FIG. 20 is copied onto the field 508 of FIG. 5; in the next step S2106, the content of the field 2012 in FIG. 20 is copied onto the field 518 in FIG. 5; and after process steps as necessary are conducted, the process operation ends.

Further in step S2104, the content of the field 2006 in FIG. 20 is copied onto the field 508 of FIG. 5; in the next step S2107, the content of the field 2014 in FIG. 20 is copied onto the field 518 in FIG. 5; and after process steps as necessary are conducted, the process operation ends.

Moreover in step S2105, the content of the field 2008 in FIG. 20 is copied onto the field 508 of FIG. 5; in the next step S2108 the content of the field 2016 in FIG. 20 is copied onto the field 518 in FIG. 5; and after process steps as necessary are conducted, the process operation ends.

Through the process described above, when trying to obtain attribute values through a PC in the future, attribute values corresponding to the "Region•Language Information" attribute selected can be obtained.

(Second Embodiment)

Next, a second embodiment of the present invention will be described with reference to FIGS. 22 through 28.

Due to the fact that the basic configuration of a peripheral equipment control system according to the present embodiment is identical to the first embodiment described above, drawings from the first embodiment will be used as necessary in the description.

Figure 22:
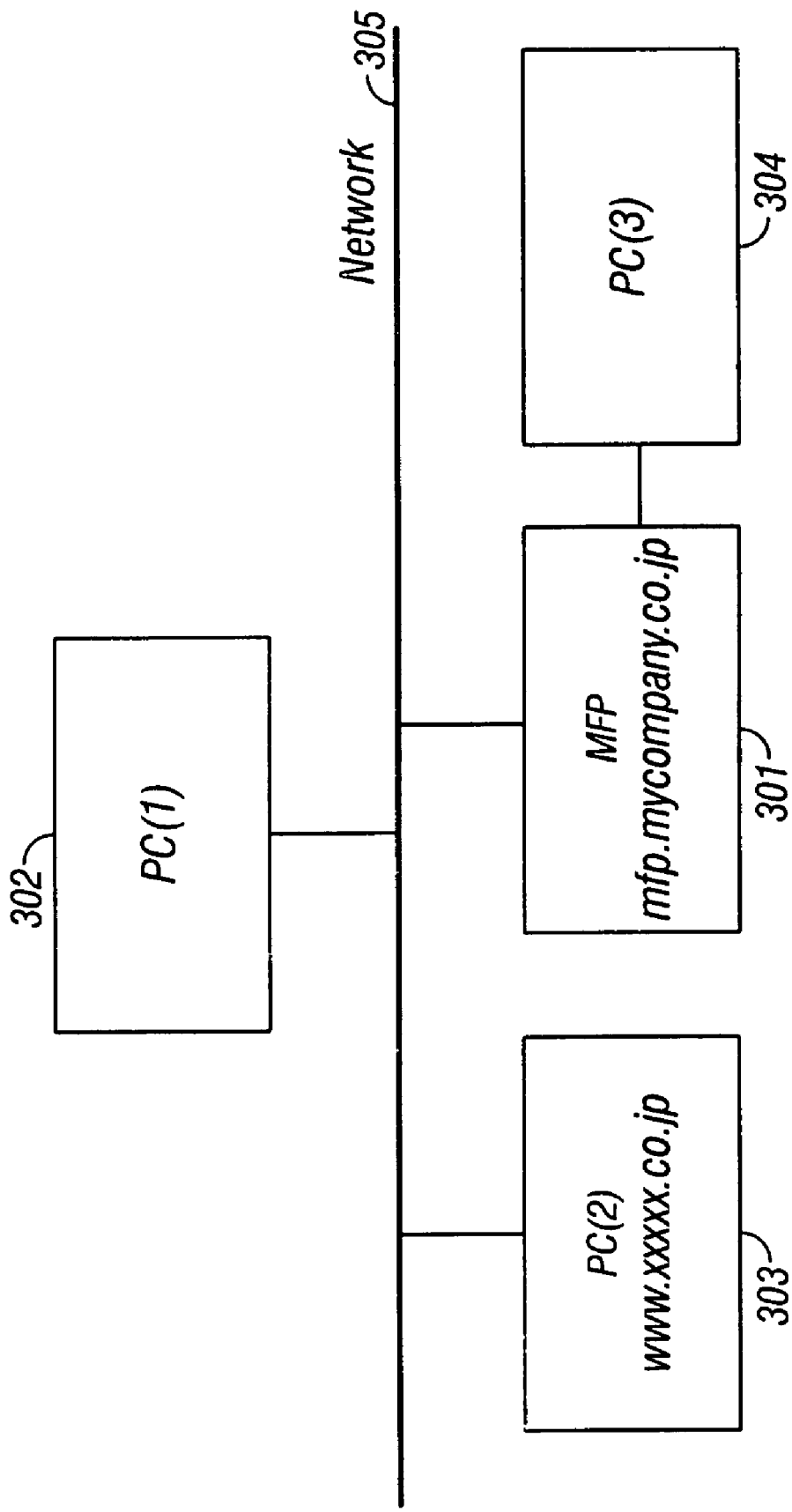
FIG. 22 is a block diagram showing an example of a network system configuration on which peripheral equipment in a peripheral equipment control system in accordance with a second embodiment of the present invention operates.

FIG. 22 is a block diagrams showing an example of a network system configuration on which the peripheral equipment control system according to the present embodiment and having a configuration identical to FIG. 1 operates. In FIG. 22, those parts that are identical to parts in FIG. 3 from the first embodiment are numbered the same.

The difference in FIG. 22 compared to FIG. 3 is that in FIG. 22 of the present embodiment there is a Web server operating on the PC (2) 303 and the MFP 301, which are peripheral equipment, so that they can provide Web contents to other PCs. The PC (2) 303's URL is http://www.xxxx-.co.jp and the MFP 301's URL is http://mfp.mycompany-.co.jp.

Other structures and actions in FIG. 22 are identical to those in FIG. 3.

In the peripheral equipment control system according to the present embodiment, the information in FIG. 6 is obtained by the peripheral equipment from the Web server installed on the PC (2) 304.

Figure 23:
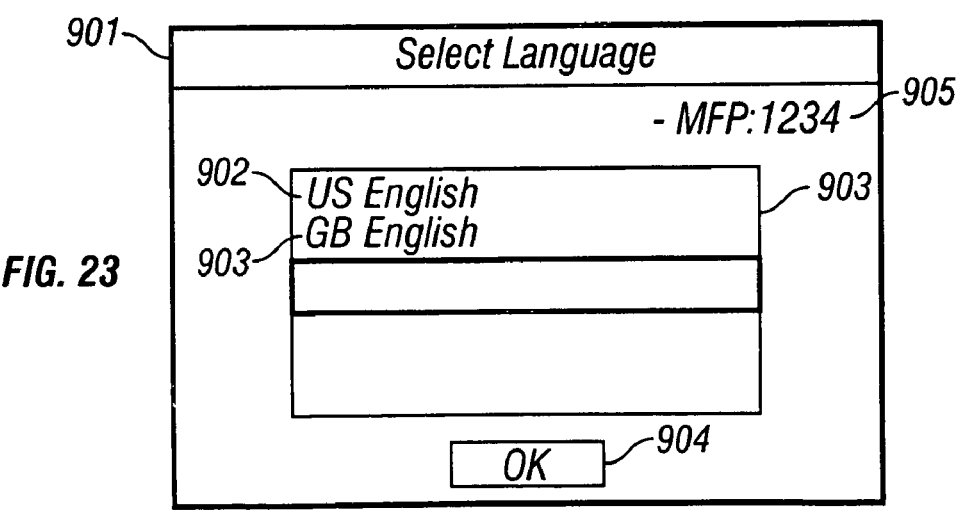
FIG. 23 is a drawing showing an example of a setting screen for the "Region•Language Information" attribute of the peripheral equipment in a peripheral equipment control system in accordance with the second embodiment of the present invention.

FIG. 23 is a drawing showing an example of a setting screen for the "Region•Language Information" attribute in the peripheral equipment control system according to the present embodiment.

The screen shown in FIG. 23 is a screen with which the user sets the "Region•Language Information" attribute when a job is input into peripheral equipment in FIG. 1; those parts that are identical to parts in FIG. 9 for the first embodiment are numbered the same.

The difference in FIG. 23 compared to FIG. 9 is the highlighted display 903 (i.e., the value of the "Region•Language Information" attribute currently selected). In other words, "Japan•Japanese" is selected in FIG. 23.

Other structures and actions in FIG. 23 are the same as those in FIG. 9.

Figure 24:
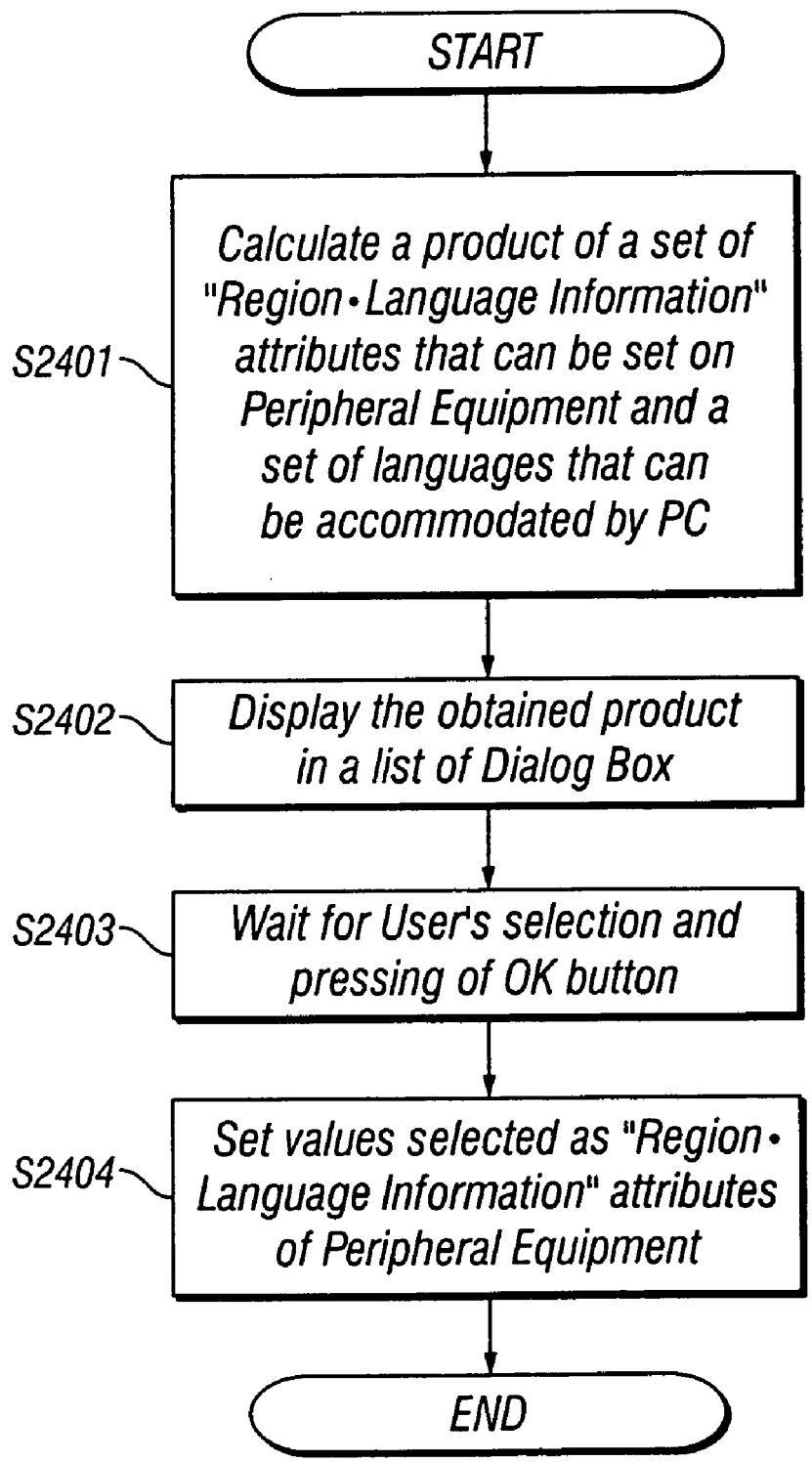
FIG. 24 is a flowchart showing the flow of process operation to set the "Region•Language Information" attribute of the peripheral equipment according to a user selection in the peripheral equipment control system in accordance with the second embodiment of the present invention.

Next, referring to FIG. 24, a description is made as to the process operation that takes place when a PC in FIG. 22 in the peripheral equipment control system according to the present embodiment sets the attributes of one of the peripheral equipment in FIG. 1 by having the user select and designate a region•language for the "Region•Language Information" attribute.

First, in step S2401, the product of a set of attribute values that can be set as the "Region•Language Information" attribute that were obtained by following the flowchart in FIG. 8, and a set of regions/languages that a PC in FIG. 3 can display, is calculated. In the next step S2402, the product obtained in the preceding step S2401 is displayed as a list in a dialog box on the setting screen for the "Region•Language Information" attribute in FIG. 23. In the following step S2403, the user selects the region•language and presses the OK button 904. Once the OK button 940 is pressed, the process proceeds to S2404, where the region•language selected by the user is set as the "Region•Language Information" attribute for the peripheral equipment, and the process operation ends.

Figure 25:
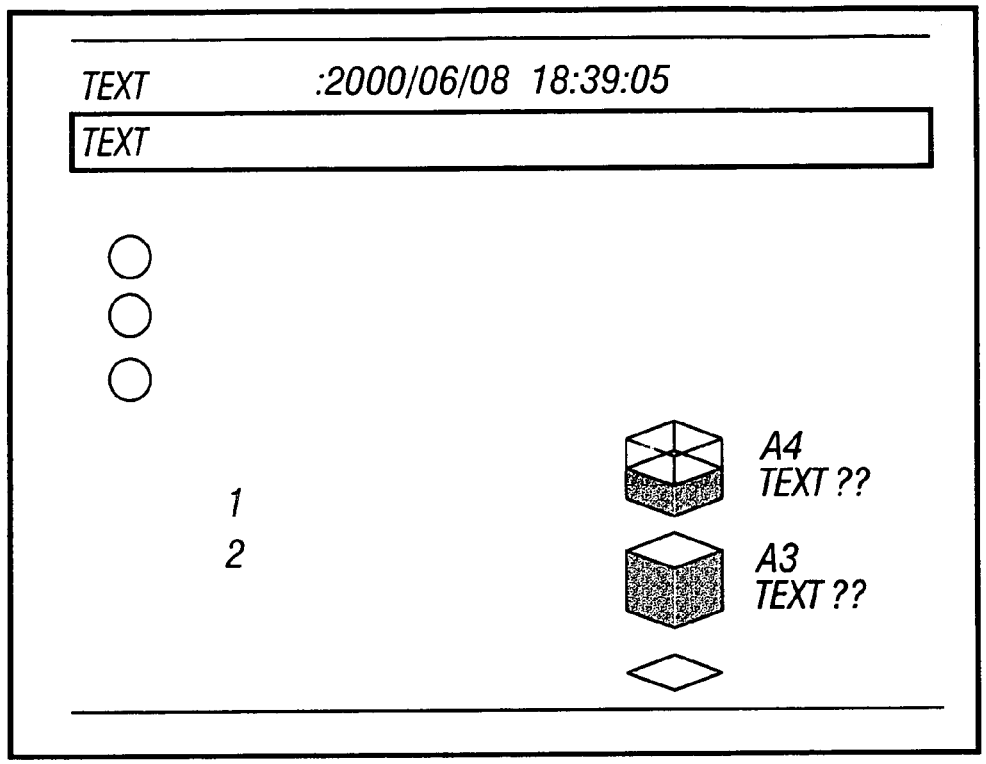
FIG. 25 is a drawing showing an example of a Web screen of peripheral equipment when "Japan•Japanese" is set as the "Region•Language Information" attribute in the peripheral equipment control system in accordance with the second embodiment of the present invention.

FIG. 25 is a drawing showing an example of a screen display on the Web browser connected to the peripheral equipment. This screen is displayed when "Japan•Japanese" is set as the "Region•Language Information" attribute for the peripheral equipment and displays in Japanese the status of the printer, scanner and fax.

Figure 26:
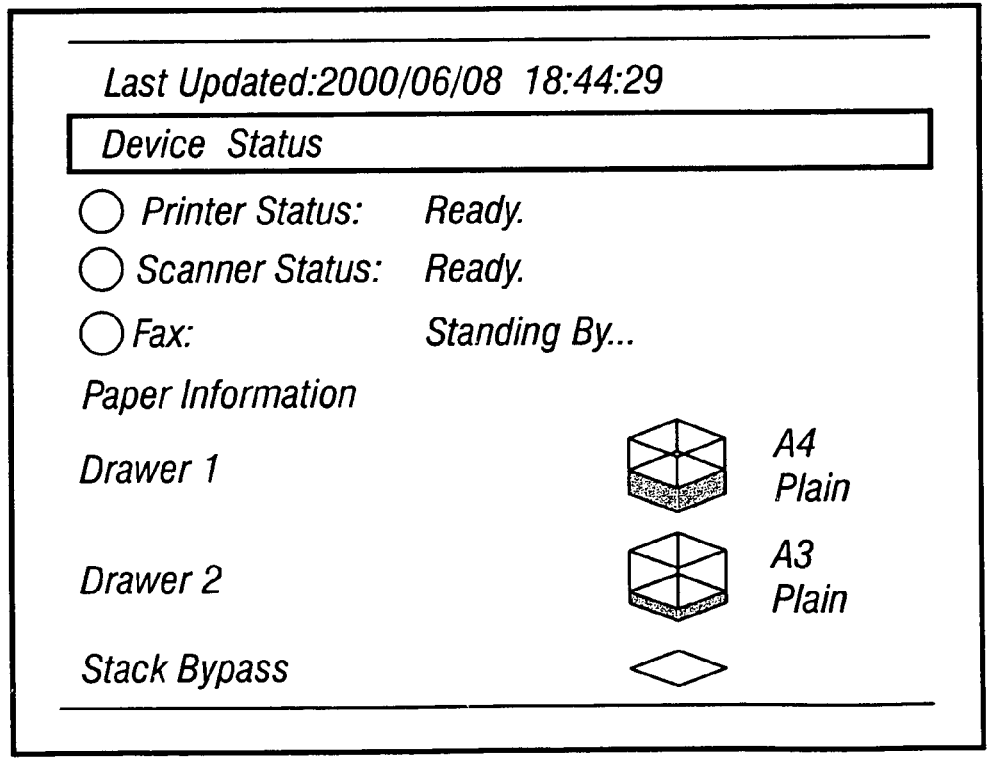
FIG. 26 is a drawing showing an example of a Web screen of peripheral equipment when "US•English" is set as the "Region•Language Information" attribute in the peripheral equipment control system in accordance with the second embodiment of the present invention.

FIG. 26 is the screen displayed when "US•English" is set as the "Region•Language Information" attribute for the peripheral equipment, and items that were in Japanese in FIG. 25 are shown in English.

Figure 27:
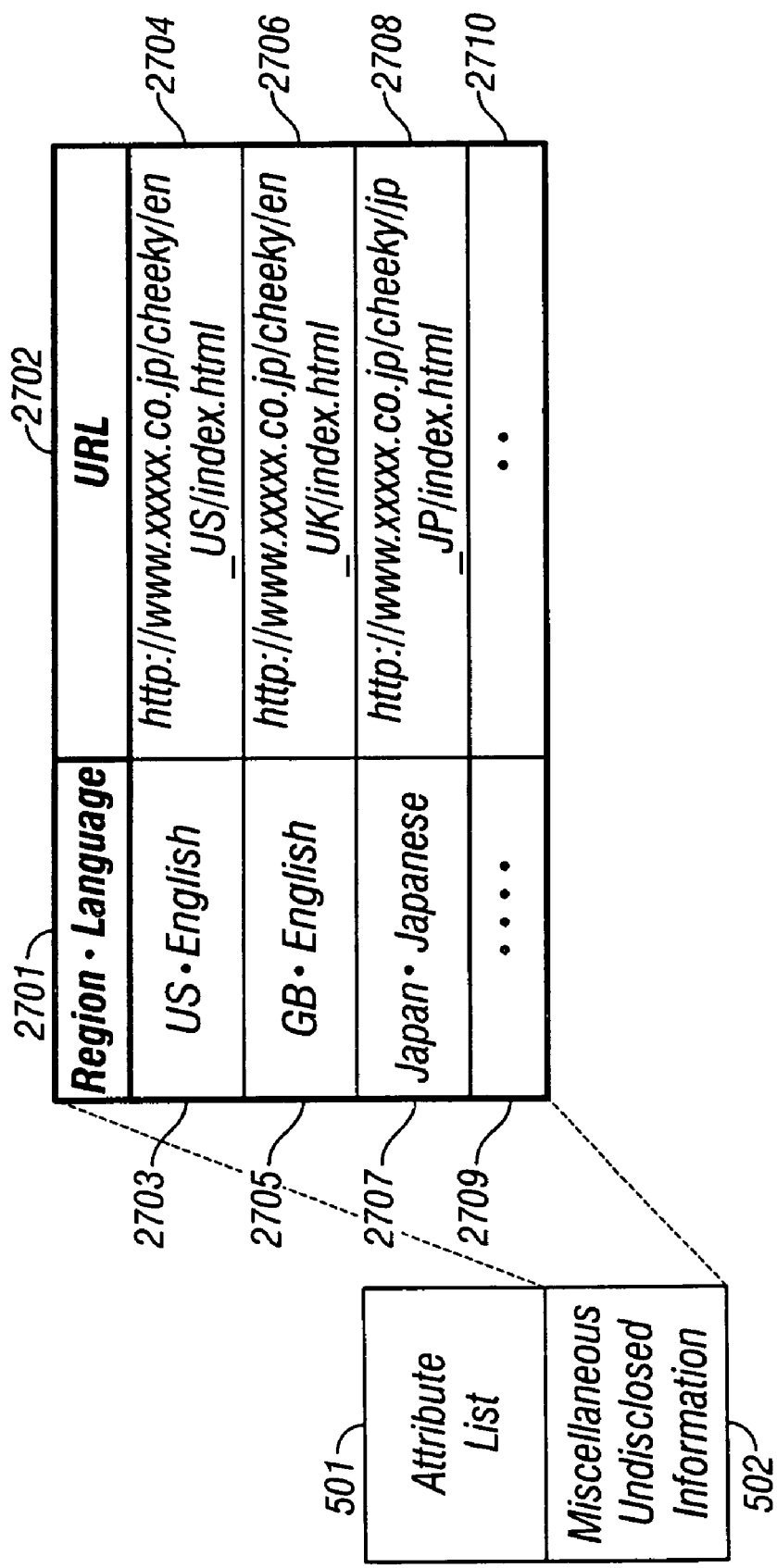
FIG. 27 is a drawing showing an example of URL information held under "Miscellaneous Undisclosed Information" in the peripheral equipment control system in accordance with the second embodiment of the present invention.

FIG. 27 is a drawing showing URL information held under the "Miscellaneous Undisclosed Information" 502 in FIG. 5, which is required when switching the Web contents according to the setting for the "Region•Language Information" attribute. As shown in FIG. 27, there is a URL that corresponds to each region•language.

In FIG. 27, reference numeral 501 denotes the attribute list; reference numeral 502 denotes the miscellaneous undisclosed information; reference numerals 2701 and 2702 denote columns; reference numerals 2703, 2705 and 2707 denote each a pair of region and language (region/language); and reference numerals 2704, 2706 and 2708 denote URLs.

Under the column 2701 there are regions/languages 2703, 2705, 2707 and 2709; under the column 2702 there are URLs 2704, 2706, 2708 and 2710 that correspond to the items under the column 2701. By accessing the URLs 2704, 2706, 2708 and 2710 listed here, Web contents corresponding to each region/language can be obtained.

In the present embodiment, these Web contents are stored in PC (2) 304 in FIG. 3. In other words, the results reached by linking to these URLs are inside the PC (2) 304.

Next, a description is made as to an algorithm used to update Web contents depending on the value set as the "Region•Language Information" attribute in the peripheral equipment control system according to the present embodiment.

Figure 28:
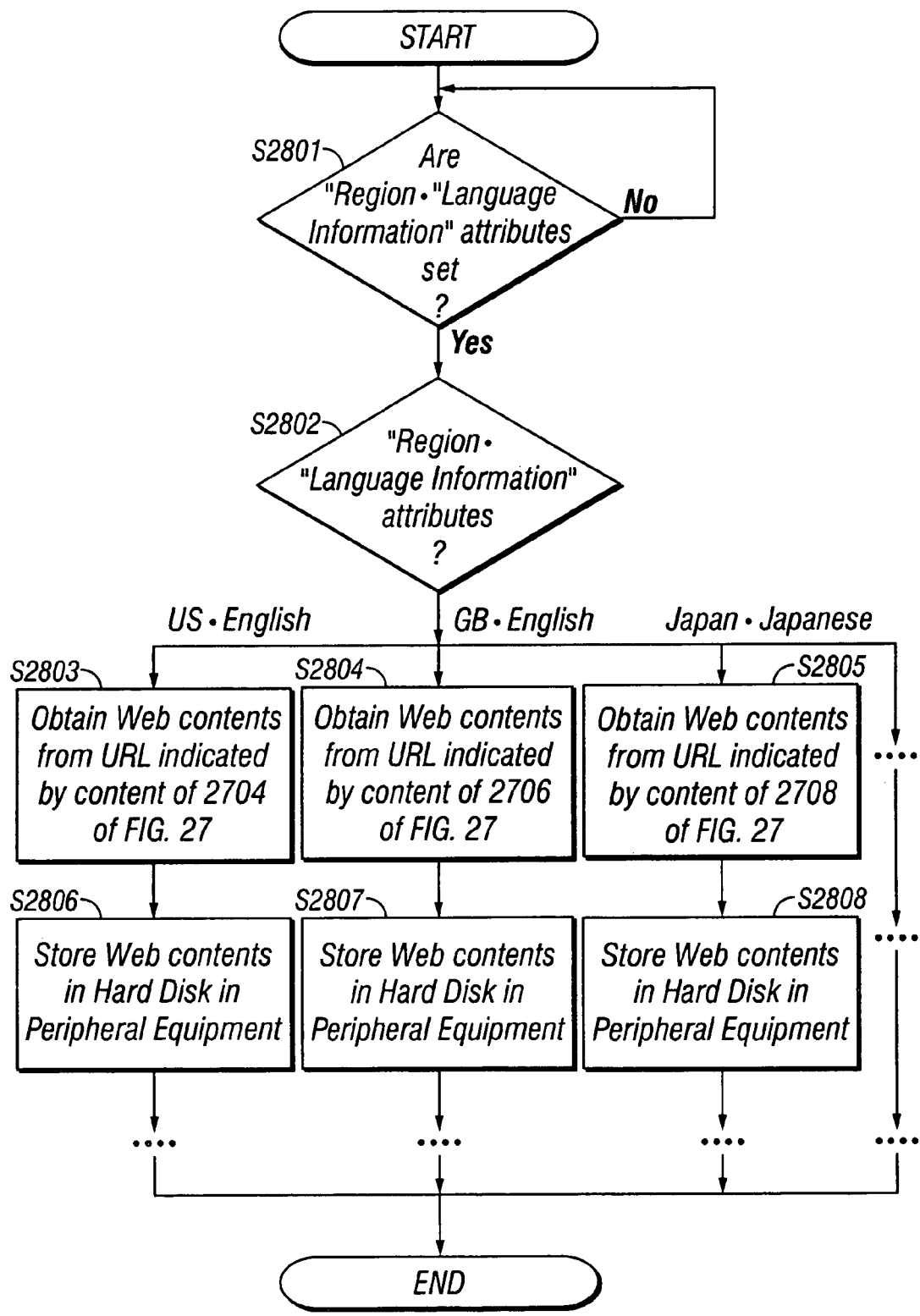
FIG. 28 is a drawing showing an algorithm to update Web contents depending on the setting of the "Region•Language Information" attribute in the peripheral equipment control system in accordance with the second embodiment of the present invention.

FIG. 28 is a drawing showing an algorithm used to update Web contents depending on the value set as the "Region•Language Information" attribute.

At the first divergence, processing varies depending on the value of the "Region•Language Information" attribute. In the subsequent processing, Web content corresponding to the region•language information of each attribute is obtained from the PC (2) 304 in FIG. 3 and stored in a directory under mfp.mycompany.co.jp in the peripheral equipment.

That is, first in step S2801 whether the "Region•Language Information" attribute has been set is determined until it is set. If the answer to this is affirmative (Yes), the process proceeds to the next step S2802 and determines the content of the "Region•Language Information" attribute. If the "Region•Language Information" attribute is "US•English" the process proceeds to step S2803; if it is "GB•English" the process proceeds to step S2804; and if it is "Japan•Japanese" the process proceeds to step S2805.

In step S2803, the Web content is obtained from the URL indicated by the content of the field 2704 in FIG. 27; in the next step, S2806 the Web content obtained in the preceding step S2803 is store in the hard disk of the peripheral equipment; and after process steps as necessary are conducted, the process operation ends.

Further in step S2804, the Web content is obtained from the URL indicated by the content of the field 2705 in FIG. 27; in the next step S2807, the Web content obtained in the preceding step S2804 is stored in the hard disk of the peripheral equipment; and after process steps as necessary are conducted, the process operation ends.

Moreover in step S2805, the Web content is obtained from the URL indicated by the content of the field 2708 in FIG. 27; in the next step S2808, the Web content obtained in the preceding step S2805 is store in the hard disk of the peripheral equipment; and after process steps as necessary are conducted, the process operation ends.

Through the above, when accessing http://mfp.mycompany.co.jp in order to obtain Web contents through a PC, Web content corresponding to the "Region•Language Information" attribute selected can be obtained.

The present invention is also applicable when it is used with an information server that has similar functions as a Web server and that is assembled into peripheral equipment.

The purpose of the present invention, needless to say, can be achieved by providing a system or a device with a memory medium storing software program codes that would realize the functions of each embodiment described above, and by having the computer (or a CPU or MPU) of the system or the device read and execute the program codes stored in the memory medium.

In this case, the program codes themselves that are read from the memory medium would realize the functions of the embodiments described above, and the memory medium storing the program codes would constitute the present invention.

As the memory medium to provide the program codes, floppy (R) disks, hard disks, magnetic optical disks, CD-ROMs, CD-Rs, CD-RWs, DVD-ROMs, DVD-RAMs, DVD-RWs, DVD+RWs, magnetic tapes, nonvolatile memory cards, or ROMs can be used.

Further, it is needless to say that executing the program codes read by the computer not only covers situations in which the functions of the embodiments described above are realized, but also covers situations in which an operating system operating on the computer performs a part or all of the actual processing based on the instructions in the program codes and the functions of the embodiment described above are realized through such processing.

Moreover, it is needless to say that another situation covered is one in which the program codes read from the memory medium are written on a memory equipped on an expansion board inserted into a computer or on an expansion unit connected to a computer; a CPU or other similar devices equipped on the expansion board or the expansion unit performs a part or all of the actual processing based on the instructions in the program codes; and the functions of the embodiments described above are realized through such processing.

What is claimed is:

1. A peripheral apparatus that is capable of providing information to a computer via a network, the peripheral apparatus comprising:
    a manager that manages component information of components assembled into the peripheral apparatus, wherein a plurality of component identifiers are assigned to one of the components and the plurality of component identifiers are represented in respective different languages;
    a selector that selects one component identifier represented in a certain language from among the plurality of component identifiers represented in the respective different languages for the one component; and
    a transmitter that transmits the component information managed by the manager including the one component identifier selected by the selector.

2. A peripheral apparatus according to claim 1, wherein a Web server is responsive to a demand by a Web client operating on the computer to output the component information in a format that is understandable by the Web client.

3. A peripheral apparatus according to claim 1, wherein the selector selects the component identifier in response to an instruction from a Web client.

4. A peripheral apparatus according to claim 3, wherein a Web server provides the Web client with information for selecting a region among multiple regions, and the selector selects the component identifier according to the region selected by the Web client.

5. A peripheral apparatus according to claim 3, wherein a Web server provides the Web client with information for selecting a language among multiple languages, and the selector selects the component identifier according to the language selected by the Web client.

6. A peripheral apparatus that is capable of providing information to a computer via a network, the peripheral apparatus comprising:
    a storage device that stores component information of components assembled in the peripheral apparatus, wherein a plurality of component identifiers represented in respective different languages are assigned to one of the components in the component information;
    a Web server that outputs the component information in a format that is understandable by a Web client; and
    a selector that selects one component identifier represented in a certain language to be included in the component information to be output by the Web server from the plurality of component identifiers represented in the respective different languages for the one component.

7. A peripheral apparatus according to claim 6, wherein the selector selects the component identifier in response to an instruction from the Web client.

8. A peripheral apparatus according to claim 6, wherein the Web server provides the Web client with information for selecting a region among multiple regions, and the selector selects the component identifier according to the region selected by the Web client.

9. A peripheral apparatus according to claim 6, wherein the Web server provides the Web client with information for selecting one of languages among multiple languages, and the selector selects the component identifier according to the language selected by the Web client.

10. A peripheral apparatus according to claim 6, wherein the apparatus has at least one of a printer function, a scanner function, a facsimile function and a copy function.

11. A method for controlling a peripheral apparatus that is capable of providing information to a computer via a network, the method comprising the steps of:
    managing component information of components assembled in the peripheral apparatus, wherein a plurality of component identifiers represented in respective different languages are assigned to one of the components in the component information;
    outputting from a Web server the component information in a format that is understandable by a Web client; and
    selecting one component identifier represented in a certain language to be included in the component information to be output by the Web server from the plurality of component identifiers represented in the respective different languages for the one component.

12. A method for controlling a peripheral apparatus according to claim 11, wherein the selecting step selects the component identifier in response to an instruction from the Web client.

13. A method for controlling a peripheral apparatus according to claim 11, wherein the Web server provides the Web client with information for selecting a region among multiple regions, and the selecting step selects the component identifier according to the region selected by the Web client.

14. A method for controlling a peripheral apparatus according to claim 11, wherein the Web server provides the Web client with information for selecting a language among multiple languages, and the selecting step selects the component identifier according to the language selected by the Web client.

15. A method for controlling a peripheral apparatus according to claim 11, wherein the peripheral apparatus has at least one of a printer function, a scanner function, a facsimile function and a copy function.

16. A computer program stored on a computer readable medium, the program to be executed by a computer of a peripheral apparatus that is capable of providing information using a Web server to a computer via a network, the computer program comprising the steps of:
    reading from a storage device that stores component information of components assembled in the peripheral apparatus the component information, wherein a plurality of component identifiers represented in respective different languages are assigned to one of the components in the component information;
    outputting the read component information from the Web server in a format that is understandable by a Web client; and
    selecting one component identifier represented in a certain language to be included in the component information to be output by the Web server from the plurality of component identifiers represented in the respective different languages for the one component.

17. A computer program according to claim 16, wherein the selecting step selects the component identifier in response to an instruction from the Web client.

18. A computer program according to claim 16, further comprising the Web server providing the Web client with information for selecting a region among multiple regions, wherein the selecting step selects the component identifier according to the region selected by the Web client.

19. A computer program according to claim 16, further comprising the Web server providing the Web client with information for selecting a language among multiple languages, wherein the selecting step selects the component identifier according to the language selected by the Web client.

20. A computer program according to claim 16, wherein the peripheral apparatus has at least one of a printer function, a scanner function, a facsimile function and a copy function.

21. An information processing apparatus comprising:
    a network interface unit adapted to communicate with a peripheral apparatus that stores a plurality of component identifiers represented in respective different languages assigned to one of a plurality of components of the peripheral apparatus and to transmit specific information to the peripheral apparatus; and
    a display control unit adapted to receive from the peripheral apparatus one component identifier represented in a certain language selected from among the plurality of component identifiers for the one component in the peripheral apparatus based on the specific information transmitted by said network interface unit, and to control a display unit to display the received one component identifier.

22. An information processing apparatus according to claim 21, wherein the specific information indicates a location of the peripheral apparatus, and said display control unit receives one of the plurality of component identifiers that fits the location and controls the display unit to display information that corresponds to the location.

23. A method for an information processing apparatus, comprising:
    communicating with a peripheral apparatus that stores a plurality of component identifiers represented in respective different languages assigned to one of a plurality of components of the peripheral apparatus to transmit specific information to the peripheral apparatus; and
    a display control step of receiving from the peripheral apparatus one component identifier represented in a certain language selected from among the plurality of component identifiers for the one component in the peripheral apparatus based on the transmitted specific information, and controlling a display unit to display the received one component identifier.

24. A method according to claim 23, wherein the specific information indicates a location of the peripheral apparatus, and said display control step receives one of the plurality of component identifiers that fits the location and controls the display unit to display information that corresponds to the location.

25. A computer program stored on a computer readable medium, the program executing a method for an information processing apparatus, the program comprising:

communicating with a peripheral apparatus that stores a plurality of component identifiers represented in respective different languages assigned to one of a plurality of components of the peripheral apparatus to transmit specific information to the peripheral apparatus; and a display control step of receiving from the peripheral apparatus one component identifier represented in a certain language selected from among the plurality of component identifiers for the one component in the peripheral apparatus based on the transmitted specific information, and controlling a display unit to display the received one component identifier.

* * * * *

UNITED STATES PATENT AND TRADEMARK OFFICE
CERTIFICATE OF CORRECTION

PATENT NO. : 7,124,178 B2
APPLICATION NO. : 10/131991
DATED : October 17, 2006
INVENTOR(S) : Torii It is certified that error appears in the above-identified patent and that said Letters Patent is hereby corrected as shown below:

SHEET 7:
Fig. 17, at reference numeral 905, "Coluor:" should read -- Color --.

COLUMN 2:
Line 23, "inquire" should read -- inquire of --.

COLUMN 4:
Line 44, "is store" should read -- is stored --.

COLUMN 6:
Line 14, "is store" should read -- is stored --.

COLUMN 8:
Line 24, "regions-lan-" should read -- regions · lan- --; and
Line 67, "regions-languages" should read -- regions · languages --.

COLUMN 9:
Line 6, "940" should read -- 904 --.

COLUMN 11:
Line 10, "region/language" should read -- region · language --;
Line 52, "diagrams" should read -- diagram --.

COLUMN 12:
Line 31, "regions/languages" should read -- regions · languages --;
Line 37, "940" should read -- 904 --;
Line 62, "region/language);" should read -- region · language); --; and
Line 64, "regions/languages" should read -- regions · languages --.

UNITED STATES PATENT AND TRADEMARK OFFICE
CERTIFICATE OF CORRECTION

PATENT NO.       : 7,124,178 B2
APPLICATION NO.  : 10/131991
DATED            : October 17, 2006
INVENTOR(S)      : Torii It is certified that error appears in the above-identified patent and that said Letters Patent is hereby corrected as shown below:

COLUMN 13:
Line 32, "is store" should read -- is stored --; and
Line 44, "is store" should read -- is stored --.

Signed and Sealed this

Eleventh Day of March, 2008

JON W. DUDAS
*Director of the United States Patent and Trademark Office*